Patented Mar. 30, 1943

2,314,946

UNITED STATES PATENT OFFICE 2,314,946

PREPARATION OF OXY-TETRONIC ACIDS

Fritz Micheel and Hans Haarhoff, Munster, Germany, assignors to Boehringer Corporation, New York, N. Y., a corporation of New York No Drawing. Application July 31, 1940, Serial No. 348,830. In Germany August 2, 1939

5 Claims. (Cl. 260—344)

This invention relates to methods of preparing heterocyclic compounds.

It is well-known that, when allowing to react 2 molecules of the ethyl ester of the OH benzoylated glycolic acid $C_6H_5COOCH_2COOC_2H_5$ with one another, oxy-tetronic acid is obtained (see Berichte der Deutschen Chemischen Gesellschaft 1934, vol. 67, p. 1660). This acid possesses a great reducing power and may therefore be employed, for instance, as a developer. Efforts to condense the ethyl ester of the OH benzoylated glycolic acid with ethyl esters of other aliphatic α-oxy-acids with the result of obtaining homologues of the oxy-tetronic acid have hitherto not been successful (see, for example, dissertation Fritz Jung, Goettingen, 1934). Such syntheses would be of great interest, considering the fact that they lead to compounds of the type of the ascorbic acid.

We have now surprisingly found that this "mixed" ester condensation of the OH acylated glycolic acid with other aliphatic α-oxy-acids may still be effected when starting from its esters with higher alcohols of more than 2 carbon atoms instead of the ethyl ester. Especially suitable is the benzyl ester; however, the carboxylic group of the OH acylated glycolic acid may also be esterified with other alcohols of the aliphatic, aliphatic-aromatic or aromatic series containing more than 2 carbon atoms in the molecule.

The protection of the hydroxy group of the glycolic acid is, preferably, effected by the benzoic acid; however, also other acids unable to undergo ester condensation—i. e. acids which in neighboring position to the esterified carboxylic group do not possess a reactive $CH_2$-group—are useful for this purpose. The other component of condensation is an ester of a mono- or polybasic aliphatic mono- or polyoxy-acid containing at least one hydroxy group in neighboring position to a carboxylic group. The hydroxy groups of this component must be protected too, e. g. by benzoic acid. The condensation may be carried out according to known methods, for example by employing alkali metal in absolute alcoholic solution.

By our invention one may manufacture a number of new compounds which are very important on account of their reducing and pharmacological properties.

Examples 1. 10 grams of benzoyl glycolic acid benzyl ester (1 mol) and 8.3 grams of ethyl ester of the OH group of the benzoylated lactic acid are dissolved in 100 cc. of dry benzene in an apparatus free of oxygen and through which nitrogen is passed. Gradually 3.62 grams of potassium are brought in while stirring, whereupon the mixture is heated in a bath of 90–95°. The whole of the potassium having been dissolved (after about 1½ hours) 100 cc. of absolute alcohol are added and once more boiled for 2–3 hours. After cooling a quantity of 2 n sulfuric acid somewhat larger than the equivalent of the postassium, is added, while cooling with ice and thoroughly stirring. The further working down takes place in a $CO_2$-atmosphere. The aqueous and benzene layer are separated in a separating funnel, the former once more shaken out with benzene and concentrated by evaporation in vacuo. The dry residue is several times extracted with acetic ether and the united extracts evaporated in vacuo. The remaining pulp of crystals is pressed out on a porous tile and recrystallised from a mixture of ether and petroleum ether. The so obtained 3,4-dioxy-5-methyltetron melts at 174° C.

Yield of the pure product 1.5 grams (30% of the theory).

$C_5H_6O_4$: c.C 46.14%   H 4.65%
f. C 46.03%   H 4.67%

At the titration with n/100 iodine solution (acid) 2 atoms of iodine are consumed for 1 molecule $C_5H_6O_4$.

The reaction proceeds probably as follows:

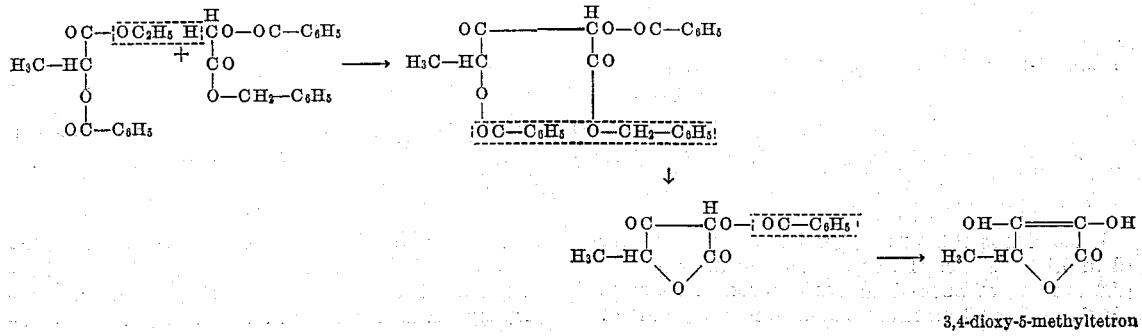

3,4-dioxy-5-methyltetron

2. In a stirring apparatus through which dry nitrogen free of oxygen is passed, 2.88 grams of potassium (about 2.5 atoms) are added to a solution of 13.8 grams of benzoyl glycolic acid benzyl ester in 125 cc. of absolute benzene while thoroughly stirring, whereupon the mixture is slowly heated. At a bath temperature of 70° C. formation of the ester enolate will take place under formation of hydrogen. Then the temperature of the bath is slowly increased up to 90° C., duration of the action—from the beginning of the reaction—1½ hours. Now 10 grams of dibenzoyl d l-glyceric acid ethylester (1 mol) are added and the mixture heated for two hours at 90°. Thereupon 100 cc. of absolute ethyl alcohol are added and boiled for 5 further hours at 90°. After cooling somewhat more than the equivalent of 2n sulfuric acid is added while stirring and cooling with ice. The two layers are separated in a $CO_2$-atmosphere free of oxygen and the aqueous layer is shaken out twice with benzene; the extract is thickened at 35° in vacuo under $CO_2$. The dried residue is thoroughly extracted with acetic ester and the extract concentrated in vacuo at 30°. From the syrup obtained in this manner crystals will be separated out within about 5 days when dried in high vacuo over phosphorus pentoxide. The crystals are exhausted by suction in an atmosphere of carbon dioxide and freed from the syrup perhaps still adhering on the porous plate, also in a $CO_2$-atmosphere. After recrystallising several times from a mixture of acetic ester and petroleum ether the so obtained 3,4 dioxy-5-oxy-methyltetron has a melting point of 154–155° C. (measured in the Kofler-micro-apparatus).

1.931 mg.; 2.915 mg. $CO_2$, 0.650 mg. $H_2O$, 0.008 mg. R f.          C 41.36   H 3.78
c. $C_5H_6O_5$   C 41.08   H 4.14

3. To a solution of 8.3 grams of benzoyl glycolic acid benzyl ester (2 mol) in 100 cc. of dry benzene 1.3 grams of potassium (2.2 atoms) are added in a nitrogen atmosphere under stirring and heated for 1.5 hours at a bath temperature of 90°. Now 7.5 grams (1 mol) of tribenzoyl l-threonic acid isopropyl ester in 75 cc. of benzene are added drop by drop and boiled for 2 hours.

Thereupon a solution of 1.3 grams of sodium in 40 cc. of isopropyl alcohol is added and the mixture once more boiled for 3 hours. After having added diluted sulfuric acid (10% more than the equivalent) the mass is worked down under $CO_2$. The quantity of ascorbic acid determined in the raw product by titration with an acid solution of iodine amounts to 380 milligrams (about 14% of the theory). The reaction proceeds probably as follows:

dibenzoyl l-threonic acid lactone (about 1 mol.) in 75 cc. of benzene is added drop by drop (all under nitrogen in a stirring apparatus). After having boiled for one hour a solution of sodium alcoholate (1.3 grams sodium in 40 cc. of absolute alcohol) is added and boiled for further 2 hours. After cooling a 10% sulfuric acid (corresponding to 6 grams of sulfuric acid) is added gradually, the mixture is diluted with water and worked down in a $CO_2$-atmosphere. The product obtained in this manner contains about 250 milligrams (10% of the theory) ascorbic acid determined by titration with an acid solution of iodine. It reduces an acid solution of silver nitrate.

Various changes may be made in the details disclosed in the foregoing specification without departing from the invention or sacrificing the advantages thereof.

We claim:

1. Process of preparing homologues of oxytetronic acid consisting in condensing alcohol esters of acylated glycolic acid, said alcohols containing more than two carbon atoms in the molecule, and being taken from the group consisting of the aliphatic, aliphatic-aromatic and aromatic series, with esters of aliphatic oxy-acids other than glycolic acid and which contain at least one hydroxy group in α-position and the hydroxy groups of which are acylated to prevent ester condensation thereof during the reaction, said oxy-acids containing no interfering other reactive groups, or radicals, the condensation being carried out by employing alkali metal and absolute alcohol, the reaction mixture being then acidified and the solution containing the desired compound worked up by evaporation of the liquid.

2. Process of preparing homologues of oxytetronic acid, consisting in condensing alcohol esters of acylated glycolic acid, said alcohols containing more than two carbon atoms in the molecule, and being taken from the group consisting of the aliphatic, aliphatic-aromatic and aromatic series, with esters of aliphatic oxy-acids other than glycolic acid and which contain at least one hydroxy group in α-position and the hydroxy groups of which are acylated by benzoic acid, said oxy-acids containing no interfering other reactive groups, or radicals, the condensation being carried out by employing alkali metal and absolute alcohol, the reaction mixture being then acidified and the solution containing the desired compound worked up by evaporation of the liquid.

3. Process of preparing homologues of oxytetronic acid, consisting in condensing the benzyl ester of benzoylated glycolic acid with esters of aliphatic oxy-acids other than glycolic acid and which contain at least one hydroxy group in α-position and the hydroxy groups of which are

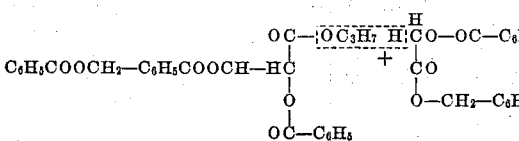

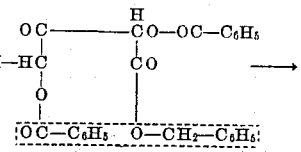

Tribenzoyl-l-threonic acid isopropylester     Benzoyl glycolic acid benzyl ester

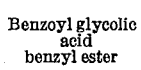

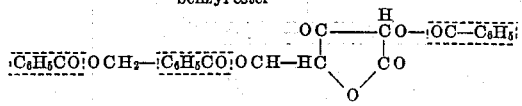

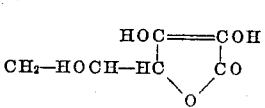

Ascorbic acid 4. 8.3 grams of benzoyl glycolic acid benzyl ester (2 mol.) in 75 cc. of dry benzene and 1.3 grams (2.2 atoms) of potassium are allowed to react to 70° C. After 30 minutes a solution of 5 grams of acylated by benzoic acid, said oxy-acids containing no interfering other reactive groups, or radicals, the condensation being carried out by employing alkali metal and absolute alcohol, the reaction mixture being then acidified and the solution containing the desired compound worked up by evaporation of the liquid.

4. Process of preparing 3,4-dioxy 5-methyltetron, consisting in condensing the benzyl ester of benzoylated glycolic acid with the ethylester of benzoylated lactic acid, the condensation being carried out in benzolic solution with the aid of alkali metal and absolute alcohol, the reaction mixture being then acidified and after separation of the benzolic solution from the aqueous layer, the former is evaporated, the residue extracted with acetic ester and after evaporation the residue is recrystallized to 3,4-dioxy-5-methyltetron of the melting point 174° C.

5. Process of preparing 3,4-dioxy 5-oxy-methyl tetron, consisting in condensing the benzyl ester of the benzoylated glycolic acid with dibenzoyl-dl-glyceric acid ethyl ester, the condensation being carried out in benzolic solution with the aid of alkali metal and absolute alcohol, the reaction mixture being then acidified and after separation from the aqueous layer the benzolic solution is evaporated, the residue extracted with acetic ester and after evaporation the residue is crystallized to 3,4-dioxy-5-oxy-methyltetron of the melting point 154–155° C.

FRITZ MICHEEL.
HANS HAARHOFF.